(12) United States Patent
Seetzen et al.

(10) Patent No.: US 10,056,055 B2
(45) Date of Patent: Aug. 21, 2018

(54) DISPLAY MANAGEMENT METHODS AND APPARATUS

(75) Inventors: Helge Seetzen, Westmount (CA); Robin Atkins, Cambell, CA (US); Neil W. Messmer, Langley (CA); Gerwin Damberg, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 830 days.

(21) Appl. No.: 13/580,776

(22) PCT Filed: Feb. 18, 2011

(86) PCT No.: PCT/US2011/025366
§ 371 (c)(1),
(2), (4) Date: Aug. 23, 2012

(87) PCT Pub. No.: WO2011/106247
PCT Pub. Date: Sep. 1, 2011

(65) Prior Publication Data
US 2013/0038790 A1    Feb. 14, 2013

Related U.S. Application Data

(60) Provisional application No. 61/307,547, filed on Feb. 24, 2010, provisional application No. 61/364,693, filed on Jul. 15, 2010.

(51) Int. Cl.
*G09G 5/02* (2006.01)
*H04N 9/67* (2006.01)

(52) U.S. Cl.
CPC ............... *G09G 5/02* (2013.01); *H04N 9/67* (2013.01); *G09G 2320/0666* (2013.01);
(Continued)

(58) Field of Classification Search
None
See application file for complete search history.

(56) References Cited

U.S. PATENT DOCUMENTS 4,500,919 A * 2/1985 Schreiber ............... 358/518
5,144,420 A * 9/1992 Omuro ................... 358/518
(Continued)

FOREIGN PATENT DOCUMENTS

EP    1770999    4/2007
EP    2048643    4/2009
(Continued)

OTHER PUBLICATIONS

Akyuz, A.O. (2007). "Optimizing the High Dynamic Range Imaging Pipeline". (Doctoral dissertation, University of Central Florida, 2007.
(Continued)

*Primary Examiner* — Aaron M Richer

(57) ABSTRACT

Apparatus and methods for mapping video signal parameters such as tone and color may be applied at various points in a video generation and delivery pipeline. apparatus may be configured to control mappings based on a range of inputs which may include one or more of: ambient conditions, user inputs, control information, adaptation models. Apparatus and methods may be applied to display video or other images so as to preserve a creative intent embodied in video or other image data.

12 Claims, 9 Drawing Sheets

(52) U.S. Cl.
CPC . *G09G 2340/0485* (2013.01); *G09G 2340/06* (2013.01); *G09G 2340/10* (2013.01); *G09G 2360/144* (2013.01); *G09G 2370/04* (2013.01)

(56) References Cited

U.S. PATENT DOCUMENTS

| | | | | |
|---|---|---|---|---|
| 6,128,407 | A * | 10/2000 | Inoue et al. | 382/167 |
| 6,594,388 | B1 | 7/2003 | Gindele | |
| 2005/0104900 | A1* | 5/2005 | Toyama et al. | 345/629 |
| 2005/0152597 | A1* | 7/2005 | Spaulding et al. | 382/162 |
| 2007/0183656 | A1 | 8/2007 | Kuwahara | |
| 2008/0131016 | A1* | 6/2008 | Kokemohr | G06T 5/009 382/254 |
| 2008/0266314 | A1* | 10/2008 | Butterworth | 345/590 |
| 2009/0027558 | A1 | 1/2009 | Mantiuk | |
| 2009/0201309 | A1 | 8/2009 | Demos | |
| 2010/0007599 | A1 | 1/2010 | Kerofsky | |
| 2010/0033627 | A1* | 2/2010 | Hayashi et al. | 348/500 |
| 2010/0195908 | A1* | 8/2010 | Bechtel et al. | 382/167 |

FOREIGN PATENT DOCUMENTS

| | | |
|---|---|---|
| EP | 2175660 | 4/2010 |
| WO | 2007078563 | 7/2007 |
| WO | 2009016914 | 2/2009 |

OTHER PUBLICATIONS

Myszkowski, K. et. al.,"High Dynamic range Video" Morgan & Claypool Publishers, Aug. 4, 2008.

Mantiuk, R. et. al., (2007) "High Dynamic Range Imaging Pipeline: Perception-Motivated Representation of Visual content". Proc of SPIE-IS&T Electronic Imaging, SPIT vol. 6492, 649212.

J. Lee et. al., (2009) "Piecewise Tone Reproduction for High Dynamic Range Imagng." IEEE Transactions on Consumer Electronics, vol. 55, No. 2, 911-918.

Krawczyk, G. and Myszkowski, K. (2005). "Lightness Perception in Tone Reporduction for High Dynamic Range Images". Eurographics. col. 24, No. 3, 635-645.

* cited by examiner

DISPLAY MANAGEMENT METHODS AND APPARATUS

CROSS-REFERENCE TO RELATED APPLICATIONS

This application claims priority to U.S. Patent Provisional Application Nos. 61/307,547, filed 24 Feb. 2010, and 61/364,693, filed 15 Jun. 2010, both hereby incorporated by reference in each entireties.

TECHNICAL FIELD

The invention relates to the creation, processing, distribution and/or viewing of digital images, including video images. Embodiments provide functional units that perform one or more of tone mapping and gamut mapping. Some embodiments provide functional units that may be applied at multiple points in a video creation and/or distribution pipeline.

BACKGROUND

The creator of a video production typically controls tones and colors so that, when viewed, the video content has a desired appearance as guided by the creator's creative intent. For example, a creator may wish some scenes to have a darker, more oppressive, feel than others. This may include performing color grading (or 'color timing') on the source video data.

Various display technologies are now available. For example, there are CRT-based displays, plasma displays, displays backlit by a variety of types of light sources including LEDs of various types, fluorescent lamps, high-intensity incandescent lamps, digital cinema displays etc. A particular display combines display hardware with video signal processing components that receive video signals and drive the display hardware to display video content of the video signals.

Different displays may vary significantly with respect to features such as:
 the color gamut that can be reproduced by the display;
 the maximum brightness achievable;
 contrast ratio;
 resolution;
 acceptable input signal formats;
 color depth;
 white level;
 black level;
 white point;
 grey steps;
 etc.

Consequently, the same video content may appear different when played back on different displays. Video content displayed on some displays without modification may depart from the creator's creative intent in one or more ways.

Some current displays can outperform displays that were state-of-the-art at a time when certain video content was created. For example, the displays may be capable of providing images that have brighter highlights, greater contrast, and/or wider color gamuts than legacy displays that were originally available when the video production was created. It would be desirable to take advantage of these improved capabilities without departing significantly from the creative intent embodied in the video content.

It may be desirable to play video content created to take advantage of high performance displays on legacy displays or displays that have lower capabilities. It would be desirable to provide methods and apparatus for adapting the way that the video is played to preserve as much as possible a creative intent embodied in the video content.

Different viewing environments may also cause video content to be perceived differently by viewers. For example, viewers may perceive the same video presentation presented on the same display differently depending on whether the display is being viewed in a dark room or in a brightly lit room. It would be desirable to adapt the playback of video content taking into account the environment in which the video content is being viewed to preserve as much as possible a creative intent embodied in the video content.

There remains a need for apparatus and methods which may be applied to 30 adjust video signals such that the video content has a desired appearance when played.

SUMMARY OF THE INVENTION

This invention has a number of aspects. One aspect provides functional units that take a video signal as input, and perform color mapping and/or tone mapping on the video signal to produce an output signal. The functional units may be provided at various locations in a video pipeline between the creation and displaying of video content. The functional units may receive various inputs as described herein and may be configured to vary their operation based upon the inputs. Such functional units may be embedded in devices that handle video content such as displays, set-top boxes, video players, video recorders, video editors, video processors, video servers, video content creation tools, mobile devices, video editing stations, and the like.

Such functional units may be implemented by hardware devices, programmable data processors executing software (or firmware), configurable hardware (such as FPGAs) and suitable combinations thereof. Software that, when executed, causes a data processor to implement a functional unit as described herein may be of a wide variety of types including operating system software, image rendering software, video player software, image creation software tools, video processing software, and others.

Another aspect provides tone and/or color mapping methods, units and apparatus that incorporate such units wherein mappings performed by the tone and/or color mapping units are determined at least in part by control signals that may be embedded in a video signal or otherwise associated with the video signal. In some embodiments, color and/or tone mappings are selected according to metadata embedded in, packaged with, or delivered in parallel with a video signal. Some embodiments provide set-top boxes or other apparatus that may be connected to process video data en route to a display which embody such tone and/or color mapping units and methods. In some embodiments the control signals include data indicating reference ambient conditions and the color and/or tone mappings are selected and/or set based at least in part on differences between the reference ambient conditions and ambient conditions as measured by one or more ambient sensors. The ambient sensors may, for example, detect brightness and/or color of ambient light at the display.

Another aspect provides mapping for features of video signals (the features may include, for example, one or more tone and color coordinates). The mapping may be implemented by methods and apparatus which vary the mappings over time. The mappings may be varied to take into account one or more of: ambient conditions and the expected adaptation of the eyes of observers to light. In some embodiments, the rate of change of mappings is limited so as to avoid sudden changes that would be noticeable to observers. For example parameters which define a mapping may be varied smoothly over time.

In some embodiments, color mapping is based at least in part on a color of ambient light detected at a display or assumed to be present at the display. In some embodiments, color mapping is varied based on the brightness of ambient light at a display. In some embodiments, mappings of one or more features are controlled based on sensor measurements of ambient conditions (which may, for example, include one or more of brightness of ambient light, color of ambient light, brightness of ambient light in a number of different color bands etc.) as well as on metadata that specifies how the mapping ought to be set in response to the sensor measurements.

Another aspect provides a video processing apparatus that is connectable upstream from a video display and configured to receive an input video signal, and to compress a gamut and/or tone of the input video signal to match capabilities of the display to yield an output video signal and to pass the output video signal downstream to the display. The video processing apparatus may include a communication interface for communicating with the display and receiving from the display data indicative of the capabilities of the display. A control system may set tone and gamut mapping to match the capabilities of the display.

Another aspect provides mapping for features of video signals implemented by methods and apparatus which are configured to select the mappings based at least in part on capabilities of a target display. The apparatus may determine capabilities of the target display, for example, based on user input, data relating to the target display (the data may be retrieved from or obtained from the target display itself, for example), inferred from behavior of the target display, or the like. In some embodiments comprises an interpolation/extrapolation between two video signals representing the same video images. The interpolation/extrapolation may be based on capabilities of the target display relative to capabilities associated with the two video signals.

Further aspects of the invention and features of specific embodiments of the invention are described below and/or illustrated in the accompanying drawings.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention.

Accordingly, the specification and drawings are to be regarded in an illustrative, rather than a restrictive, sense.

Figure 1:
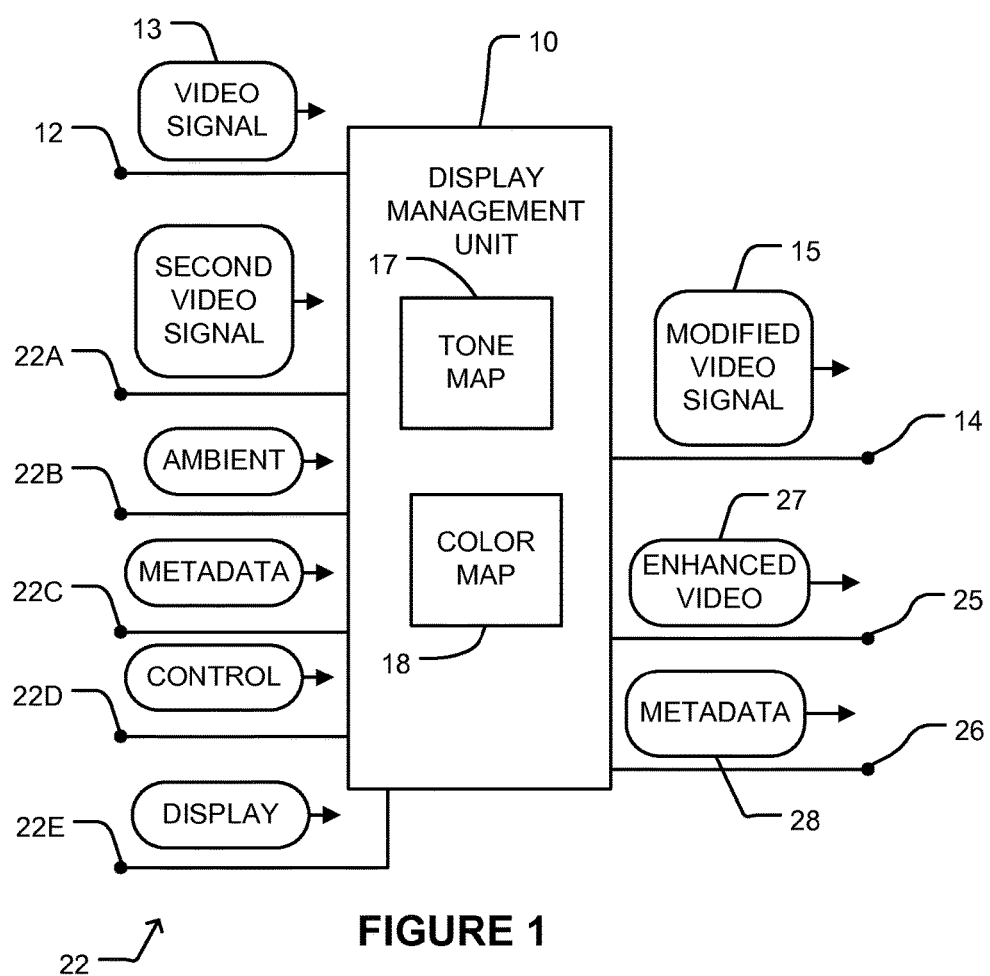
FIG. 1 is a block diagram illustrating some possible inputs for a display management unit.

FIG. 1 is a block diagram illustrating an example display management unit 10. Display management unit 10 has an input 12 for receiving a video signal 13 (typically in a digital format) and an output 14 for carrying a modified video signal 15.

Display management unit generates modified video signal 15 by mapping tone and/or color of input video signal 13 according to a tone map 17 and a color map 18 respectively. In some embodiments, tone map 17 and color map 18 are combined and mapping of both color and tone may be performed using a single combined map. Mapping of color and tone may be performed simultaneously or in sequence.

In the FIG. 1 embodiment, display management unit 10 has one or more additional inputs 22A-22E (collectively, inputs 22) capable of receiving 5 signals that may be used to control the mapping of tone and/or color in display management unit 10. Some embodiments may not include some of inputs 22.

The illustrated embodiment provides:
  a second video signal input 22A for receiving a second video signal;
  one or more ambient inputs 22B for receiving information characterizing ambient conditions (e.g. one or more of brightness of ambient light, color of ambient light, direction of ambient light relative to the display) at a display where the video content will be viewed;
  a metadata input 22C for receiving metadata characterizing one or more aspects of a creative intent that affect how the video content ought to be displayed;
  a control input 22D for receiving control information for display management unit 10;
  a display input 22E for receiving information regarding the capabilities and/or current status of a display on which the video content is to be displayed.

Display management unit 10 controls the characteristics of tone map 17 and/or color map 18 based on signals received at one or more of inputs 12 and 22 and passes the resulting modified video signal 15 to output 14. Display management unit 10 also has a second optional video signal output 25 for carrying enhanced video information 27. Enhanced video information 27 may comprise, for example, information such as, high spatial frequency information, enhanced dynamic range information or the like, and a metadata output 26 for carrying metadata 28 relating to the video content being managed.

The inputs and outputs of display management unit 10 are logically separate but are not necessarily physically separate. Two or more distinct input signals may be received at a single physical input or presented at a single physical output. For example, metadata may be embedded in a video signal such that a single physical input may serve as both input 20 and metadata input 20C. In such cases display management unit 10 comprises a suitable mechanism for separating different input signals that may be received at the same physical input.

One circumstance in which display management unit 10 may be used is the case where video content is to be displayed on a display capable of reproducing colors in a gamut that may be different from that of the video data presented at input 12 and/or having a dynamic range that may be different from that of the video data presented at input 12.

Figure 2A:
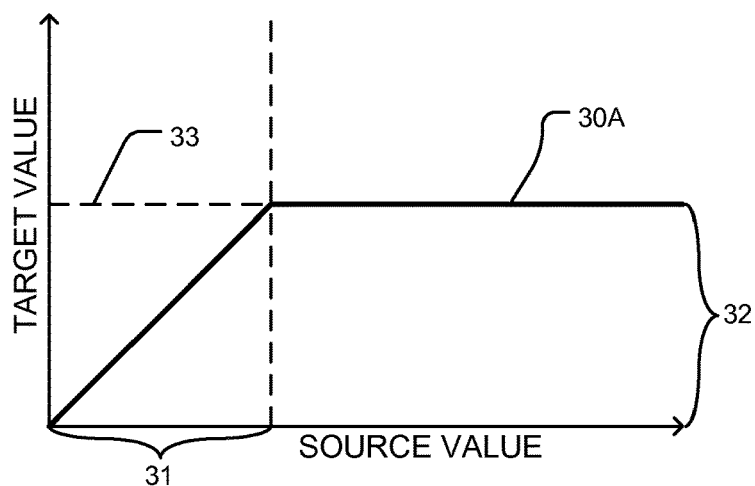
FIGS. 2A to 2F are graphs showing example gamut mapping and/or tone mapping curves for generating modified video data.
Figure 2B:
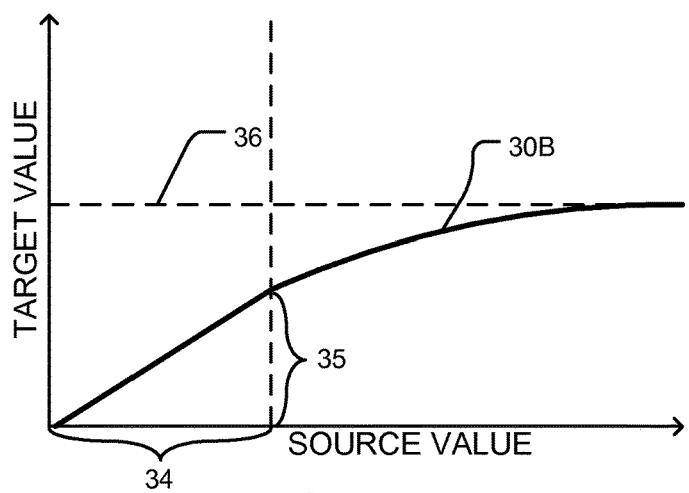
Figure 2C:
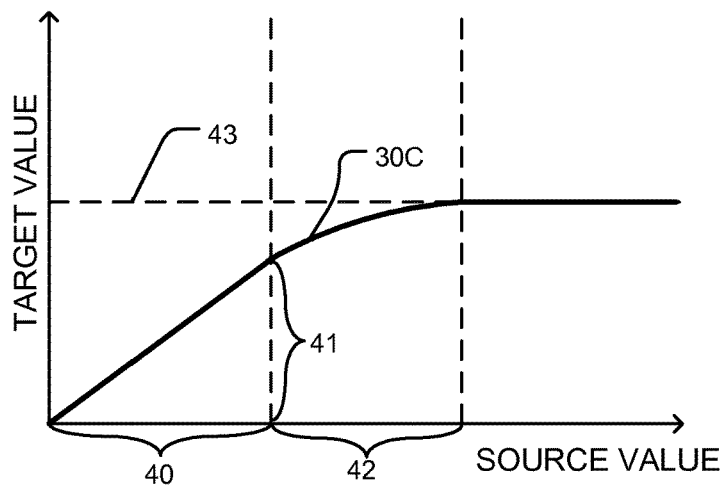

As one example, video data may be received at input 12 in a format that specifies color in a gamut broader than that of a target device such as a display and/or a dynamic range greater than that which the target device is capable of reproducing. FIGS. 2A, 2B and 2C are curves that illustrate three alternative ways to handle the mapping of parameters of a video signal. Such parameters may comprise, for example, parameters such as luminance, contrast, saturation, hue, tone, etc. The approaches illustrated in FIGS. 2A to 2C may be applied, for example to gamut mapping and/or tone mapping.

Curve 30A of FIG. 2A relates a source range of video parameters (such as, for example, luminance or gamut) in a video signal received at input 12 to a target range for a video signal presented at output 14. The axes in the graph of FIG. 2A, as well as in the graphs of FIGS. 2B-F, may be, for example linear or logarithmic. In the FIG. 2A example, a first range 31 of source values in the input signal is mapped to a second range 32 of target values of the output signal. The values may, for example, comprise values of a color attribute or luminance values. Any values in the input signal beyond first range 31 are clamped to the same value 33 in the output signal. Value 33 may, for example, be a maximum luminance of the display on which the video content is to be displayed. First range 31 and second range 32 may be equal. In some embodiments, source values in first range 31 are unaltered by the mapping.

For example, in a case where a target display is capable of reproducing luminances up to some maximum value, for example 600 cd/m$^2$, and the input signal contains luminance values exceeding that maximum value then values up to 600 cd/m$^2$ may be unaltered in mapping to the output signal while any values exceeding 600 cd/m$^2$ may be set to 600 cd/m$^2$ in mapping to the output signal. A mapping like that represented by curve 30A may be called a 'hard clipping' mapping. Hard clipping mappings may be applied to tone values, color values or both (as well as other parameters).

When hard clipping color values, the value of one channel (e.g., one of R, G or B) is out of range, the values of all channels may be scaled by the same ratio so that all channels are within range. In a linear RGB space, this ensures that the hue is unchanged. In other color spaces different techniques may be used to preserve the color. For example, in an IPT space (in which color points are specified by hue saturation and lightness values) the color may be hard clipped, for example, by clipping only the saturation value, while leaving the hue and lightness constant.

Curve 30B shown in FIG. 2B illustrates a soft compression embodiment. In this case, a first range 34 of values in the input signal is mapped to a second range 35 of values of the output signal. Any values in the input signal beyond first range 34 are compressed to values that are less than or equal to a maximum value 36 of the output signal.

Curve 30C shown in FIG. 2C illustrates a soft clipping embodiment. In this case, a first range 40 of values in the input signal is mapped to a second range 41 of values of the output signal. Ranges 40 and 41 may be the same. In some embodiments input values in range 41 are unaltered by the mapping. For a second range 42 of values in the input signal the output signal is compressed to values that less than or equal to the maximum value 43 of the output signal. Any values in the input signal beyond second range 42 are clamped to a maximum value 43 in the output signal.

The above examples show clipping and compression applied at the upper end of the input range. In other embodiments, clipping and/or compression may be applied at the lower end of the input range. Also, in some embodiments clipping and/or compression may be applied at both the upper and lower ends of the input range.

Mappings like those illustrated in FIGS. 2A through 2C may be implemented, for example, by providing a look up table. Color or luminance values for an output video signal may be obtained by using corresponding values for an input video signal as keys to search the look up table. A display management unit 10 may comprise one or more lookup tables for this purpose. In some embodiments, a plurality of lookup tables are provided for a plurality of image characteristics. For example, a display management unit 10 may comprise a luminance lookup table for looking up luminance values for an output video signal and one or more color lookup tables for looking up color values for the output signal. In other embodiments, mapping may be implemented by providing processing elements and/or logic elements configured to calculate output values from input values using a suitable mapping algorithm that takes input values as inputs and produces output values as outputs. Such a mapping algorithm may involve computing values for a function that includes a mathematical specification of a mapping curve. Some other non-limiting example mapping algorithms are discussed below.

Figure 2D:
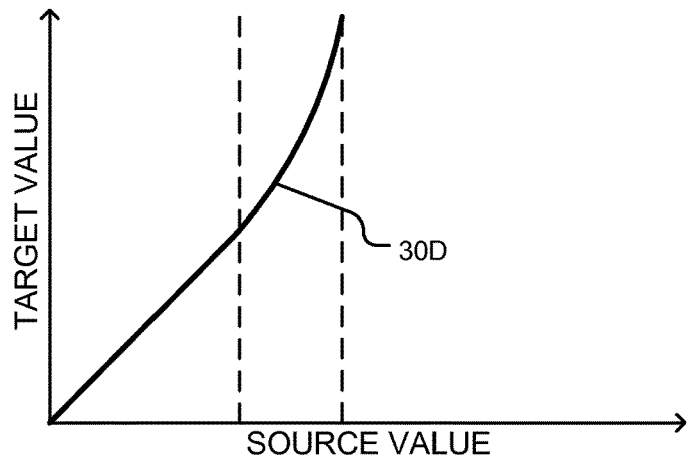
Figure 2E:
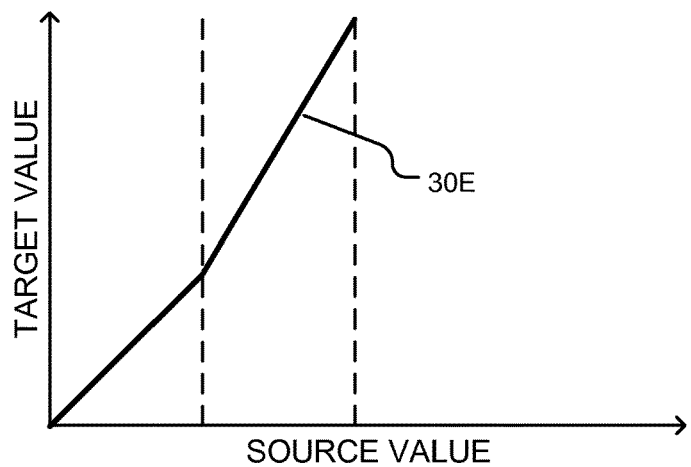
Figure 2F:
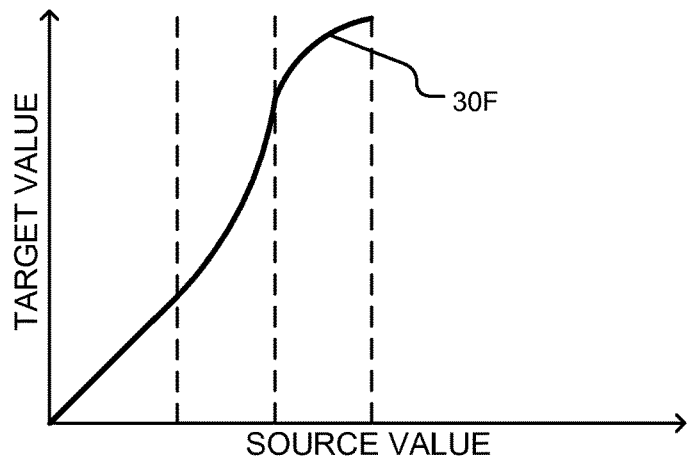

Static mappings may also be used in cases where video data is received at input 12 in a format that specifies color in a gamut narrower than that of a display and/or a dynamic range smaller than that which the display is capable of reproducing. In such case, the lookup table(s) may provide output values having a larger range than the corresponding input values. In some cases the output values may be outside of a range of values valid for the original video data. FIGS. 2D, 2E and 2F show example curves 30D, 30E and 30F. As one skilled in the art will appreciate, the curves shown FIGS. 2A-2F are for exemplary purposes only, and any of a variety of known mapping curves could also be applied. Actual mapping curves may be configured to avoid sharp corners in some embodiments.

Each of mapping curves 30A through 30F may be characterized by one or more parameters. For example, curve 30A may be characterized by a parameter P1 which both indicates the value to which the output signal is clipped and indicates the boundary between first and second ranges 31 and 32. Curve 30B may be characterized by parameters P2 and P3. P2 indicates the input value for which the output begins to be compressed and P3 indicates the maximum output value for the output signal.

Additional parameters may control the form of the compression. In general, a mapping curve of almost any shape may be characterized by a sufficient number of parameters.

Apparatus according to embodiments of the invention may map according to any suitable mapping curves. In some embodiments it may be desirable to implement mapping curves of types that have been studied in the literature. One example of such curves is Reinhard's tone mapping curve.

Mappings between values in an input signal and corresponding values in an output signal may be performed by providing logic circuits and/or programmed processors configured to apply suitable algorithms to determine output values corresponding to input values. The operation of such algorithms may also be controlled by setting parameters.

In general, the translation of values from the input signal to corresponding values in the output signal may be represented by a function:

$$V_{OUT}=F(V_{IN},P1,P2,\ldots,PN) \qquad (1)$$

Where $V_{OUT}$ is an output value, $V_{IN}$ is the corresponding input value, and P1 to PN are parameters of the function F. Different functions may have different numbers of parameters.

Some embodiments provide fixed display management units which adjust incoming video data in a manner that is independent of the image content of the video data. Some embodiments are configurable to operate in one of a number of different modes. For example, some embodiments may be configured to perform mappings like those illustrated in a selected one of two or more of FIGS. 2A to 2F, or other mappings. In such embodiments, the mapping may be changed in response to factors such as user inputs, changes in ambient conditions, metadata or other control information or the like.

Figure 3:
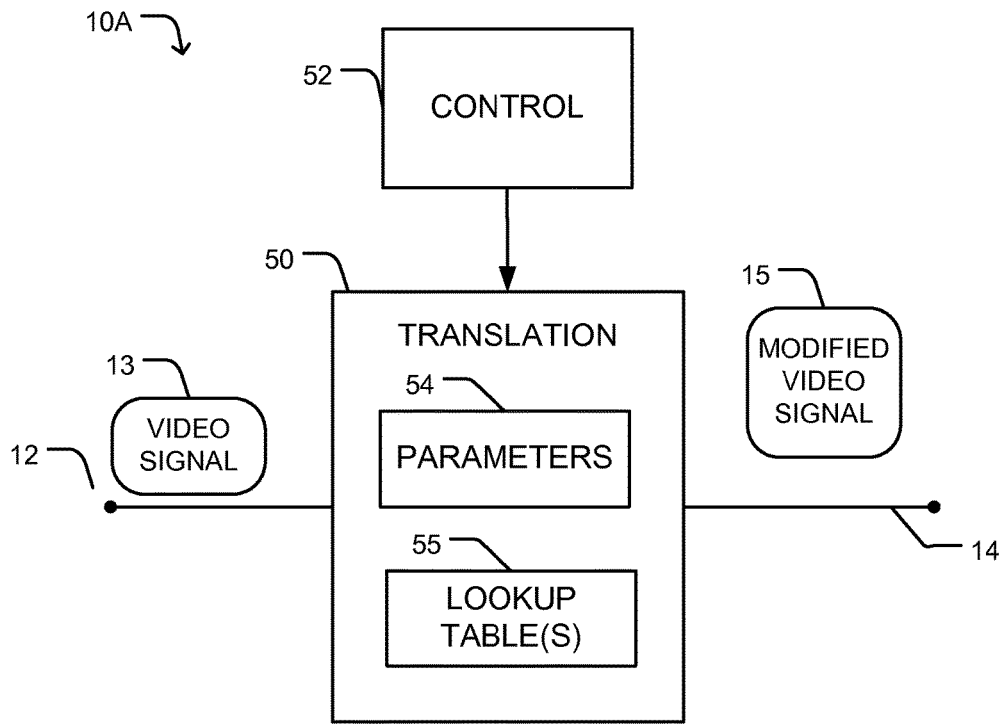
FIG. 3 is a block diagram illustrating an example display management unit.

FIG. 3 shows a display management unit 10A having an example architecture. Display management unit 10A comprises a translation block 50 and a control block 52. Translation block 50 operates to generate an output signal 15 at output 14. The manner of performing the conversion (e.g. the choice of F) and the parameters (e.g. values for P1 to PN) are determined by control block 52. Control block 52 may provide control over the operation of translation block 50, for example, by setting values for parameters 54, preparing lookup tables 55 for use by translation block 50 or the like.

Control block 52 attempts to optimize the translation provided by translation block 50 for the destination of modified video signal 15. To achieve this, control block 52 may compare explicitly communicated and/or assumed characteristics of the video content of the input video signal to explicitly communicated and/or assumed characteristics of the destination of modified video signal 15. In some embodiments, characteristics of the video content are explicitly communicated by metadata, either transmitted alongside the video signal or included with the video signal. In some embodiments, characteristics of the destination (such as display capabilities and viewing environment) are communicated by display parameters provided to data management unit 10A. In some embodiments, assumed characteristics may be preprogrammed into a memory of display management unit 10A, may be obtained through calibration of display management unit 10A, or may be specified by a user input. In some embodiments, the characteristics are luminance range supported. In some embodiments the characteristics are color gamut supported.

For example, control block 52 may determine that the destination device cannot fully reproduce one or more values from the input signal and, in response, select or create mappings for the values that are like mappings shown in one of FIG. 2A, 2B or 2C. As another example, control block 52 may determine that the destination device has the ability to reproduce a wider gamut and/or a greater dynamic range than the device that the input signal was created for. In response, control block 52 may select or create mappings for the values that are like mappings shown in one of FIG. 2D, 2E or 2F. Control block 52 may also set parameter values for the chosen mapping based upon the explicitly communicated and/or assumed characteristics of the input video content and the destination device.

In some embodiments lookup table values or other parameters that define mappings are provided in metadata. A display management unit may be configured to retrieve the metadata and to set up a mapping based on the metadata. In some embodiments the metadata may provide alternative mappings for a range of applications and the display management unit may be configured to select certain mappings from the metadata and apply those mappings. For example, metadata may include definitions of mappings (which may consist of or comprise parameter values for mappings in some embodiments and may consist of or comprise fuller specifications of mapping curves in other embodiments) for:

different ambient conditions that may be present at a destination device, such as different brightness levels, different colors of ambient light, or the like;

different target devices;

different types of media content;

different portions of a video (e.g. different frames, different scenes or the like);

and the like.

Control block 52 may control the initialization of translation block 50 to provide appropriate mapping(s) and, in some embodiments, may modify the mapping(s) over time in response to signals received at display management unit 10A.

Figure 3A:
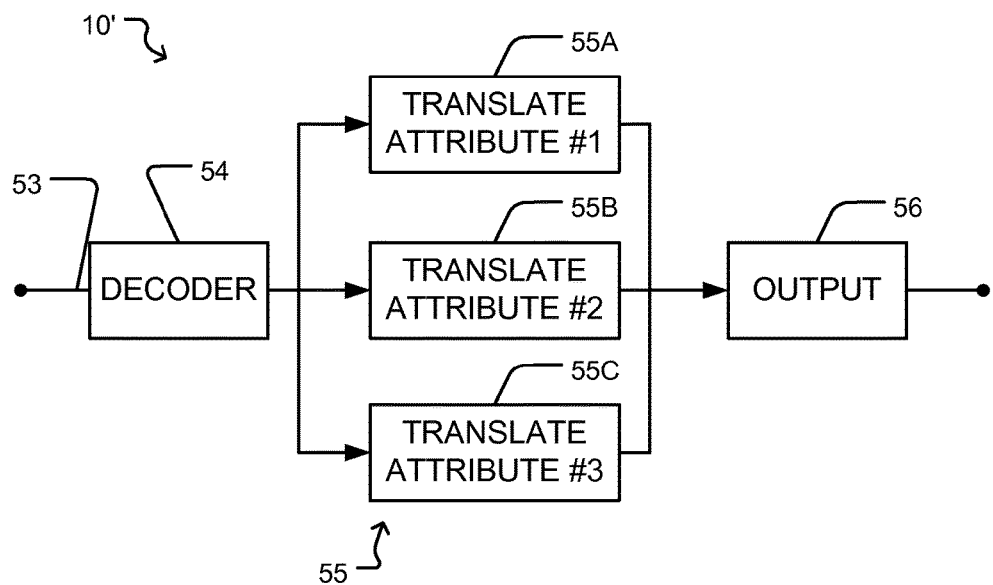
FIG. 3A is a block diagram illustrating another example display management unit.

FIG. 3A illustrates an alternative display management unit 10' which operates on a single input video signal in a fixed manner. The video signal is received at input 53 and attribute values (for example, RGB values or LUV values or XYZ tristimulus values or IPT values etc.) are extracted by a decoder 54. Parallel translation mechanisms 55A, 55B and 55C (collectively, translation mechanisms 55) map values for a corresponding attribute to mapped values. Translation mechanisms 55 may, for example, comprise lookup tables, calculation logic and/or programmed processors that determine mapped values as a function of values from the incoming video data or the like. An output block 56 writes the mapped values into output video data.

Returning to FIG. 1, display management unit 10 may provide an additional mode of operation for cases in which different video signals each carrying a different version of the same video content are received at inputs 12 and 22A. The two different versions may, for example, be individually optimized for displays having different color gamuts and/or dynamic range. If either version of the video signal has been optimized in a manner suitable for the destination device then that version may be passed to the destination device without alteration. In other cases, controller 52 may derive output signal 15 by interpolating between the two input video signals or extrapolating from the two input video signals. In cases where the two input video signals have each been optimized to preserve a creative intent (for example by suitable color timing), this mode has the advantage that the interpolated or extrapolated values may be expected to preserve that creative intent more closely than mappings based primarily on the capability of the destination device.

Figure 4A:
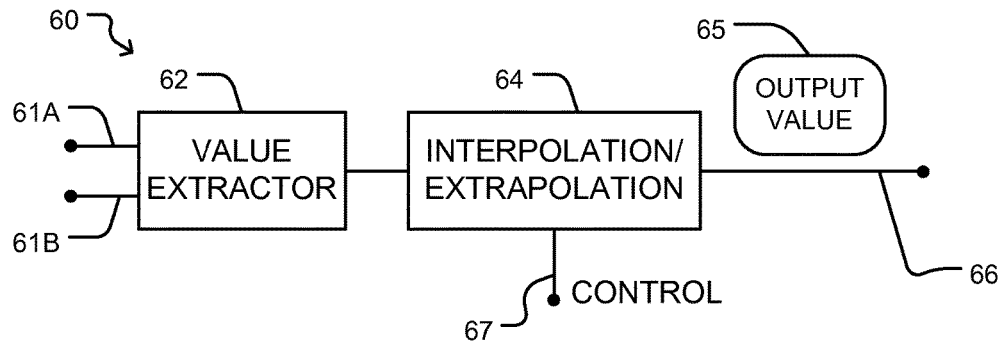
FIG. 4A is a block diagram illustrating the components of an apparatus for implementing mapping based on two or more input video signals.
Figure 4B:
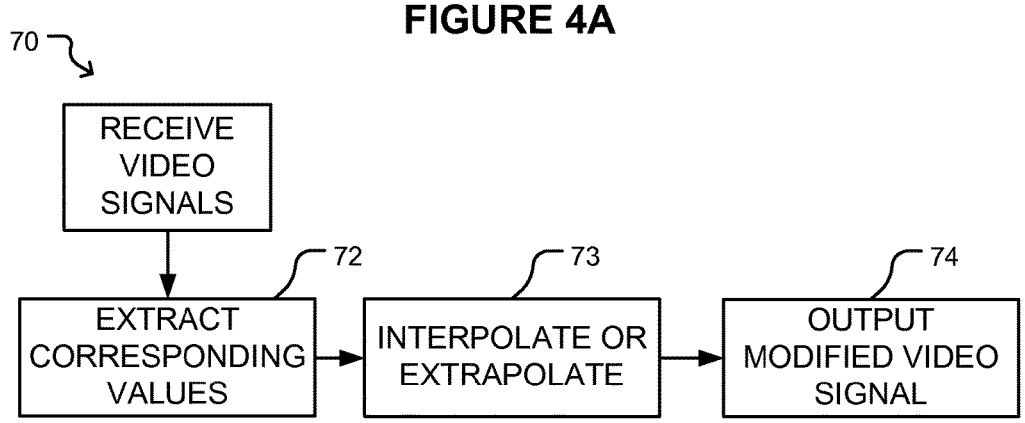
FIG. 4B is a flowchart illustrating a method for mapping based on two or more input video signals.

FIG. 4A is a block diagram illustrating the components of apparatus 60 for implementing mapping based on two or more input video signals. FIG. 4B is a flowchart illustrating a method 70 for mapping based on two or more input video signals. Apparatus 60 comprises first and second inputs 61A and 61B which carry first and second video signals, respectively. A value extractor 62 is configured to extract corresponding values from the video signals (step 72 in FIG. 4B) and to pass the values to an interpolation/extrapolation block 64. In some embodiments the value extractor extracts pixel values from the video signals. The pixel values may, for example, comprise values of a tone and/or color coordinates in a color space. In some embodiments the color space is a perceptually linear color space.

Interpolation/extrapolation block 64 is configured to generate an output value 65 by interpolating or extrapolating (step 73) the extracted values and to provide the output value in a modified video signal (step 74) at an output 66. A control input 67 of interpolation/extrapolation block 64 receives a control value that controls the operation of interpolation/extrapolation block 64. In a simple embodiment the control value is applied in interpolation/extrapolation block 64 to multiply a difference between the corresponding values in the first and second video signals. The interpolation/extrapolation performed by block 64 may be based upon a value or values received at control input 67.

Figure 4C:
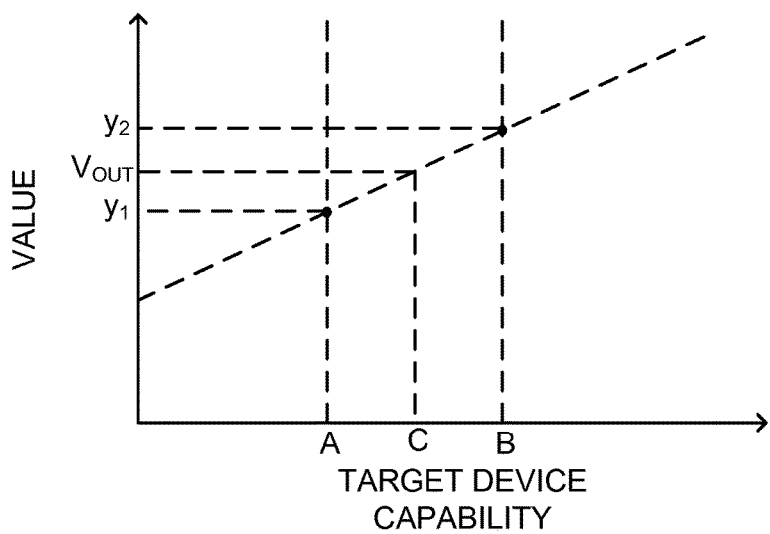
FIG. 4C is a graph illustrating a mode of interpolation/extrapolation from two input video signals.

FIG. 4C illustrates one way in which the interpolation/extrapolation may be performed. In FIG. 4C, a value in the first video signal is $y_1$ and the corresponding value in the second video signal is $y_2$. The horizontal axis in FIG. 4C indicates a target device capability. For example, the horizontal axis may indicate a dynamic range of a target device, or may indicate a logarithm of a luminance of a target device, according to some index, with the first video signal optimized for use with a target device having a capability A and the second video signal optimized for use with a target device having a capability B. If the target device for the video signal has the capability C then an output value may be determined, for example, according to:

$$V_{out} = y_1 + \left(\frac{y_2 - y_1}{B - A}\right)(C - A) \quad (2)$$

(C−A) may be positive or negative. |C−A| may be greater or less than |B−A|.

A feature of Equation (2) is that $V_{OUT}$ is the same as $y_1$ and $y_2$ if $y_1=y_2$. Thus, if a creator has deliberately set $y_1$ and $y_2$ to be the same in the first and second video signals then embodiments which apply Equation (2), as well as other embodiments that share this feature, will preserve this value in the output video signal. On the other hand, where $y_1 \ldots y_2$ $V_{OUT}$ may be different from both of $y_1$ and $y_2$.

In some embodiments, the display management unit is configured to interpolate/extrapolate following perceptual curves. For example, the display management unit may be configured to interpolate/extrapolate on the logarithm of the luminance. In some embodiments, video data is converted into a perceptually uniform color space (such as, for example, IPT or Log Yuv) before performing interpolation/extrapolation.

In some embodiments, interpolation between video data may be performed according to the following equations:

$$Y_{MDR5} = \exp(\alpha \cdot \log(Y_{LDR}) + \beta \cdot \log(Y_{VDR})) \quad (3)$$

$$x_{MDR5} = \alpha \cdot x_{LDR} + \beta \cdot x_{VDR} \quad (4)$$

$$y_{MDR5} = \alpha \cdot y_{LDR} + \beta \cdot y_{VDR} \quad (5)$$

where: Y is a luminance coordinate in a color space such as Log Yxy or Log Y u'v'; the subscript VDR (as in $Y_{VDR}$, for example) identifies data from the video signal having the higher capability (e.g. higher dynamic range and/or broader color gamut); the subscript LDR identifies data from the video signal having the lower capability; the subscript MDR identifies the output or target video signal; $\alpha$ and $\beta$. are interpolation constants; and x and y are color coordinates (for example, x and y in a Log Yxy color space or u' and v' in a Log Yu'v' color space). Here, a may be given, for example, by:

$$\alpha = \frac{\log(\max(Y_{VDR})) - \log(\max(Y_{TARGET}))}{\log(\max(Y_{VDR})) - \log(\max(Y_{LDR}))} \quad (6)$$

where: max ($Y_{VDR}$) is the maximum value for Y that can be specified in the VDR (higher-capability) video signal, max $Y_{LDR}$ is the maximum value for Y that can be specified in the LDR (lower-capability) video signal, and max ($Y_{TARGET}$) is the maximum value for Y that can be reproduced on the target display. $\beta$ may be given by $\beta=1-\alpha$.

In some embodiments, the video signal having the lower capability comprises a Rec. 709 video signal. In some embodiments the video signal having the higher capability comprises color ranges sufficient to specify colors in a gamut that encompasses all colors perceptible by the human visual system.

In some embodiments, the display management unit is configured to determine whether the capability of a target device matches (either exactly or to within some threshold) the capability for which the first or second video signal is optimized. If so, it passes the matching one of the first and second video signals to the output without modification (or with a limited modification that addresses ambient conditions and/or estimated adaptation of viewers as described herein). Otherwise interpolation/extrapolation is performed as described above, for example.

Some embodiments provide fixed display management units which generate output video data based on interpolating/extrapolating from two or more sets of input video data in a manner that is independent of the image content of the video data. For example, the output video data may have attribute values that are a weighted combination of corresponding attribute values in the input video data. Weights may be determined at least in part based upon explicit and/or assumed differences between source parameters (e.g. gamut, dynamic range) and target parameters (e.g. gamut, dynamic range).

In some such embodiments the display management unit may have two or more operational modes. Input video data may be mapped to output video data differently in the different operational modes. In some cases the different operational modes may be selected automatically at least in part based upon target parameters. For example, in some embodiments, the display management unit is configured to receive target parameters and to determine whether the target parameters define an available valid gamut and also what is the relationship of the target parameters to the parameters of the higher-quality input video data. In one example of such an embodiment:

If the target parameters are not provided or invalid, the display management unit passes through the lower-quality legacy video data (such as a Rec. 709 video stream). This ensures backwards compatibility.

If the target parameters are equal to or greater than the corresponding parameters of the higher-quality input video data then the display management unit may pass through the higher-quality video data unmodified. Alternatively, the display management unit may extrapolate from the video data to take advantage of the full capabilities of the target device.

If the target parameters reflect a capability that is lower than that indicated by the parameters of the higher-quality input video data then the display management unit may interpolate between the input video data as described above, for example.

In some embodiments, the display management unit is configured to selectively modify an incoming video signal. The selection may decide whether or not to modify values in the video signal or, in some embodiments, how to modify values in the video signal. Selection may result in some values being modified while other values of the same type (i.e. other values for the same attribute) are not modified or are modified in a different manner. Selection may be based on any or any combination of a number of criteria. For example:

Selection may be based on the magnitude of a value. For example, certain color or luminance values or ranges of values may be identified as values that ought not to be modified. A display management unit may be configured to apply one or more criteria to each value and to modify the value only if the value satisfies the one or more criteria. This type of selection may be applied, for example, to avoid modification of flesh tones, grass tones, sky tones or other tones which may be designated as "protected colors".

Selection may be based upon a location of a pixel with which values are associated. For example, certain areas of an image may be identified as selected areas for which values may be modified while other areas of the image may be identified as non-selected areas for which values ought not to be modified or ought to be modified differently. Modifications to pixel values may be made, or not, depending on whether the pixels lie within the selected areas or the nonselected areas. For example, a display management unit may receive information specifying the locations of light sources in an image (or may determine the location of light sources by analyzing the image). The display management unit may selectively modify luminance values for pixels in the immediate neighborhoods of the light sources while not altering luminance values for pixels located away from the light sources. The display management unit may modify luminance values for pixels in the immediate neighborhoods of the light sources in one manner while altering luminance values for pixels located away from the light sources in some other manner. For example, luminance for pixels located in the immediate neighborhoods of light sources may be made relatively higher than luminance for pixels located away from light sources.

Selection may be based on an assessment of whether or not mapping of a value would likely result in a visible artefact or a difference that would stand out in an objectionable way when viewed by a viewer. In some embodiments, evaluation of whether or not to select a value for modification may be based on a computational model of the human visual system.

In some embodiments the display management unit is configured or configurable to operate in an adaptive mode in which one or more mappings are determined, at least in part, on the basis of image content in the incoming video signal (s). In an example of such an embodiment, a display management unit is configured to apply a mapping for one attribute based on values of one or more other attributes. For example, a luminance mapping for a pixel may be selected or determined in part based on color values for the pixel. For another example, a mean luminance of an image reproduced on a target display device over some time frame may be used to estimate the adaptation of the eyes of a viewer and one or more mappings may be based in part on the estimated adaptation. In another example of such an embodiment, a display management unit is configured to apply a mapping for one attribute which is selected based on whether or not the pixel is identified as corresponding to a light source (for example by a local analysis of the image or by metadata identifying light source locations). In some embodiments, a display management unit varies a mapping continuously or stepwise such that the mapping can vary between a mapping as shown in FIG. 2A to a mapping as shown in FIG. 2C, for example.

In some embodiments, the mapping applied by a display management unit varies with time. For example, in some embodiments a display management unit receives inputs from sensors that monitor ambient conditions and controls mapping of values from input to output video signals based at least in part on an estimated adaptation of the eyes of observers. The adaptation to the ambient conditions may be estimated by the display management unit by modeling adaptation of the human visual system to ambient conditions. The modeled adaptation will, in general be a function of past ambient conditions. The modeled adaptation may take into account light emitted by a display receiving a video signal output by the display management unit instead of or as well as other ambient light at a viewing location. In some embodiments, ambient light may be estimated based on the video data in a video signal output by the display management unit. For example, adaptation of the human visual system may be modeled based on one or more of: the mean luminance of pixels in frames of video data over some interval and ambient lighting as measured by one or more sensors on a display or in the vicinity of the display.

In some embodiments a luminance mapping is varied depending on an estimated level of dark-adaptation. For a high level of dark-adaptation, the mapping may be adjusted such that luminances are mapped to smaller values whereas for lower levels of dark adaptation the mapping may be adjusted such that luminances are mapped to higher values. A level of dark adaptation may be estimated, 5 for example, by integrating an estimated light exposure over a characteristic adaptation period. The estimated light exposure may be determined, for example based on one or more of: a measure of the illumination provided by display of the video for example, the average or mean luminance of pixels in frames of video data) and ambient lighting as measured by one or more sensors.

Figure 5:
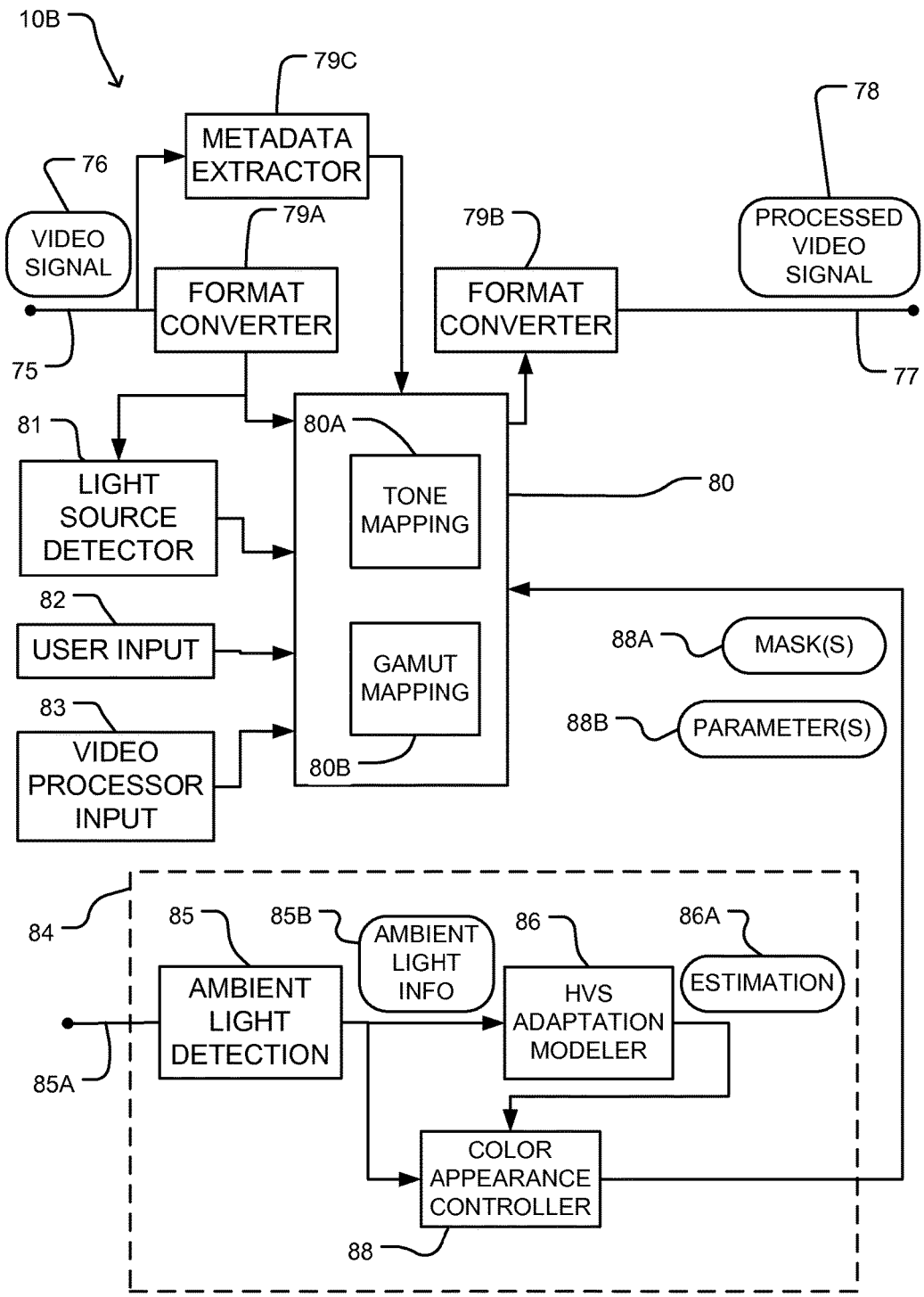
FIG. 5 is a block diagram illustrating functional blocks of an example display management unit.

FIG. 5 is a block diagram illustrating functional blocks of a display management unit 10B. Display management unit 10B represents pixel colors internally in a different format from the input and output video signals. Display management unit 10B has an input 75 that can carry a video signal 76 and an output 77 that can carry a processed video signal 78.

In the illustrated embodiment, input and output video signals 76 and 78 have formats that represent colors as tristimulus values (XYZ) and display management unit 10B represents colors internally in an IPT color space. In some embodiments, input signal 76 is in a Log Yu'v' format and output signal 78 is in a R'G'B' (gamma encoded RGB) format. In the IPT color space, I, P and T coordinates represent lightness, red-green channel and yellow-blue channel values. A format converter 79A converts input video signal 76 to the internal color space. A format converter 79B converts a processed video signal to the color space of output video signal 78.

Display management unit 10B has a mapping unit 80. In the illustrated embodiment, mapping unit 80 comprises tone mapping unit 80A and gamut mapping unit 80B. Tone mapping and gamut mapping may be combined or implemented separately, as shown. Mapping values of different attributes of the input video signal may be performed sequentially or in parallel.

In some embodiments, display management unit 10B includes an optional metadata extractor 79C. Metadata extractor 79C extracts metadata included in input signal 76 and provides the extracted metadata to mapping unit 80.

Display management unit 10B has a light source detector 81. Light source detector 81 identifies light sources in images carried by the incoming video data and provides information about such light sources to mapping unit 80. Display management unit 10B may optionally or in the alternative receive information regarding the locations of light sources in metadata embedded in the incoming video signal 76, or receive such information from a separate source. In some embodiments, different mappings of one or more of tone and color are provided for pixels associated with light source locations than for pixels not associated with light source locations. In some embodiments, mappings are implemented by values in one or more look up tables and, for at least one mapping (e.g. for mapping luminance), separate lookup tables may be provided for use in mapping pixels associated with light source locations and for pixels not associated with light source locations.

Display management unit 10B may also optionally have a user input 82 and/or a video processor input 83, which may be used to respectively provide user control and/or video processor control of various aspects of the mappings performed by mapping unit 80.

The mappings performed by mapping unit 80 may be controlled by an optional control block 84 in some embodiments. Control block 84 comprises an ambient light detection block 85 that is connected to receive one or more inputs 85A from ambient light sensors and to output information 85B indicative of ambient light at a viewing area. Ambient light information 85B is provided to a human visual system (HVS) adaptation modeler 86 that provides as an output an estimation 86A of the sensitivity of the human visual system to light.

Estimation 86A and ambient light information 85B are provided to a color appearance controller 88. Color appearance controller 88 may comprise a fuzzy logic controller, a neural network, a programmable controller, hard-wired logic, configurable logic circuits or the like. In some embodiments, color appearance controller 88 may model how certain colors and/or tones are likely to be perceived by human viewers.

Color appearance controller 88 controls the operation of mapping unit 80 for example by changing fixed mappings, mapping functions, parameters affecting mappings and/or selecting values to be affected by mappings (for example, by providing values stored in look-up tables). In some embodiments, color appearance controller is configured to alter mappings by one or more of:
 selecting one of a plurality of look-up tables to perform a mapping;
 writing different values into a lookup table used to perform the mapping;
 writing new parameter values to one or more registers or memory locations that specify selection of or behavior of a mapping algorithm implemented in hardware or software;
 etc.

These are examples only.

In some embodiments, color appearance controller 88 outputs one or more masks 88A that define which pixels of an image are to be affected (or not affected) by mappings performed by mapping unit 80 and mapping control parameters 88B that control the mappings performed by mapping unit 80. In some embodiments, masks and/or control parameters may additionally or alternatively be specified by metadata.

In some embodiments, mappings are set according to a plurality of different inputs. for example:
 an initial mapping may be performed and an output from the initial mapping may be subjected to further mapping by a mapping controlled by a color appearance controller, The initial mapping may be accomplished by a fixed mapping, interpolation/extrapolation between first and second video signals, a mapping controlled by metadata, a mapping determined in response to parameters specifying capabilities of a target device or the like;
 a mapping may be controlled in response to multiple different inputs;
 etc.

In some embodiments, color appearance controller 88 is configured to select mappings that result in increased contrast in cases where ambient light is relatively bright. In some embodiments, color appearance controller 88 is configured to select mappings to shift colors toward a color point of ambient light indicated by ambient light information 85B.

Figure 6A:
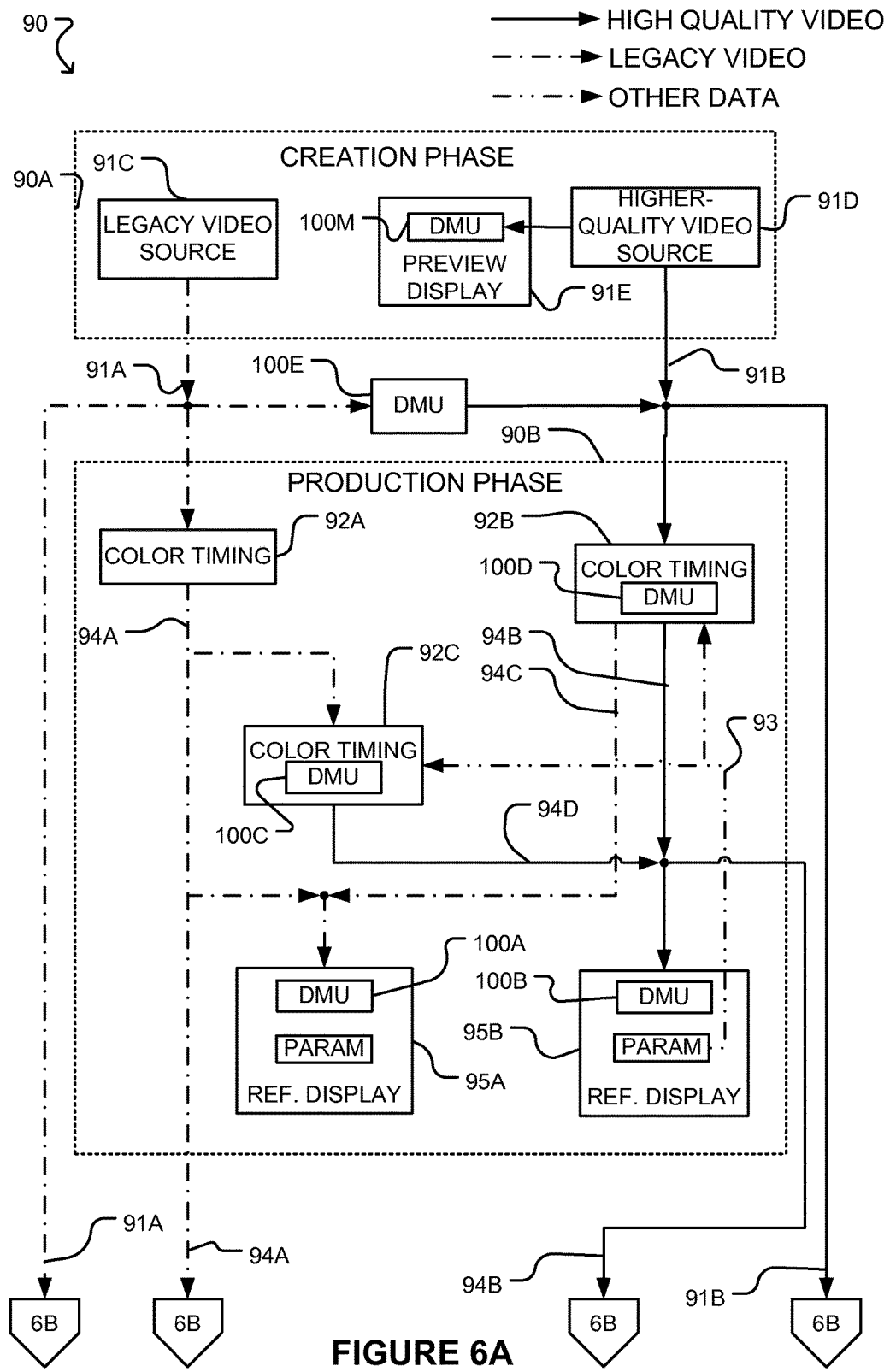
FIGS. 6A and 6B are a block diagram illustrating a video pipeline showing example contexts in which display management units may be applied.
Figure 6B:
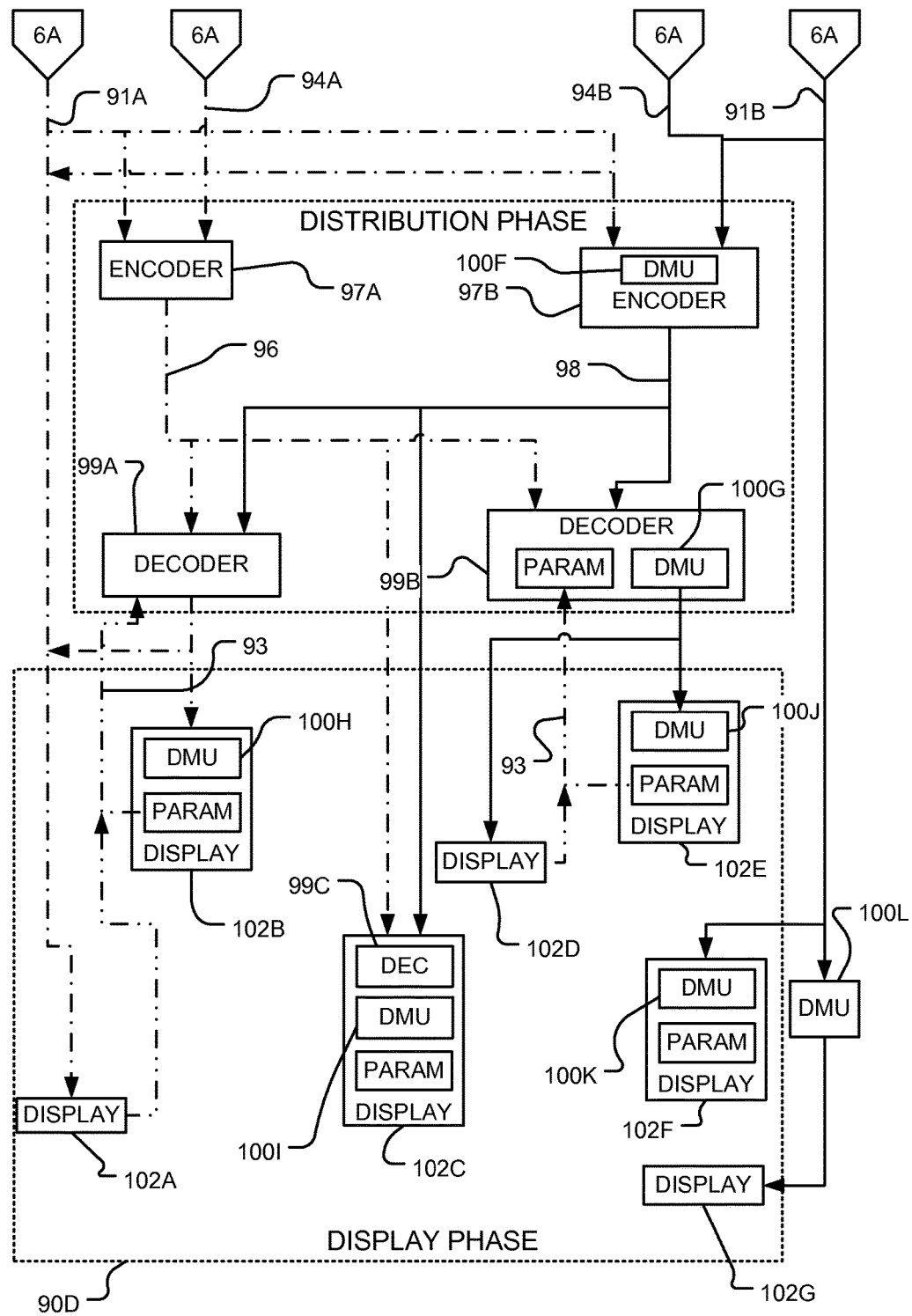

FIGS. 6A and 6B illustrate a video pipeline 90 that includes a number of display management units 100 as described herein. In some embodiments, the display management units 100 may all have the same construction (although the different display management units are in different contexts and may provide mappings that are different from one another). In other embodiments, some display management units 100 may differ in construction from others.

In the illustrated embodiment, pipeline 90 includes a creation phase 90A, a production phase 90B, a distribution phase 90C and a display phase 90D. As one skilled in the art will appreciate, the example illustrated in FIGS. 6A and 6B show a variety of components and signal paths for high quality video, legacy video, and other data which may be used in certain situations, but most actual implementations will use only a portion of these components and signal paths and/or may provide additional components and/or signal paths. Accordingly, the example of FIGS. 6A and 6B is to be understood as illustrating a range of possible situations, rather than a specific limiting implementation of a video pipeline.

Creation phase 90A includes a legacy video source 91C which generate legacy video data 91A intended for legacy displays, and/or a higher-quality video source 91D which generates higher-quality video data 91B intended for displays having higher capabilities. For example, higher-quality video data may have a greater dynamic range, broader color gamut and/or greater spatial resolution than legacy video data 91A. Creation phase 90A may also include a preview display 91E comprising a display management unit 100M. Preview display 91E and display management unit 100M may be used, for example, to preview how the higher-quality video may appear on a variety of displays. Higher-quality video source 91D and preview display 91E may be separate devices, or may be incorporated into the same device. In some embodiments, higher-quality video source 91D may comprise a camera, and preview display 91E may comprise a viewfinder or the like integrated into the camera.

Production phase 91B includes color timing stations 92A and 92B which may be operated to adjust color values in video data 91A and 91B respectively to produce color timed legacy video data 94A and color timed higher-quality video data 94B. In the illustrated embodiment, color timing station 92B comprises a display management unit 100D which may be used to control the production of color timed higher-quality video data 94B, and also to produce color timed legacy video data 94C from higher-quality video data 91B. Production phase 91B may also include another color timing station 92C comprising a display management unit 100C which produces color timed higher-quality video data 94D from color timed legacy video data 94A. Color timing stations 92B and 92C may receive other data 93 from a reference display 95B specifying the characteristics and viewing environment of reference display 95B.

In some embodiments, metadata may be associated with higher-quality video data 91B, 94B and/or 94D, and either included with the higher-quality video data or sent alongside higher-quality video data. In some embodiments, metadata is used by downstream display management units 100 to help guide the mapping functions. For example, a user could manually map the video data in color timing 92B. The controls and operations that the user manually used provides an indication of how to preserve the creative intent, and these operations could be communicated in the metadata to downstream display management units 100 to improve the quality of the mapping functions. Alternatively, a user could select light sources, or provide an explicit indication of what the creative intent for a particular scene should be, which could be communicated by the metadata.

Production phase 91B also includes reference displays 95A and/or 95B. Reference displays 95A and 95B include display management units 100A and 100B respectively. These display management units optimize video data for display and/or may be controlled to cause reference displays 95A and 95B to emulate various types of display. In the illustrated embodiment, reference display 95A may display color timed legacy video data 94A and/or 94C, and reference display 95B may display color timed higher-quality video data 94B and/or 94D. In some embodiments, only one reference display may be provided which is configured to receive and display both higher-quality and legacy video data.

In some embodiments, the video content may be adjusted for display on reference display 95B having a greater range or capability than reference display 95A. For example, reference display 95A could have the same performance as current reference displays, thus ensuring that video approved on that display would be completely backwards-compatible with existing displays. Reference display 95B could have greater capabilities to provide an enhanced version of the content for new displays which were capable of showing such enhanced content. In some embodiments, color timing station 92B is used to adjust the content for reference display 95B first, creating the higher-quality version. The higher-quality version would then be adjusted again for reference display 95A to create the low-quality version. Both versions could be passed on to the encoder for distribution, as discussed below. Many other workflows are possible—for example only a high quality version of the video content could be created, or only a low quality version in some embodiments.

An additional display management unit 100E may be provided to receive legacy video data 91A. In embodiments where there is not another source for higher quality video data 91B, display management unit 100E may create higher-quality video data 91B by extrapolation from legacy video data 91A. Display management unit 100E could be used, for example, for up-converting legacy video from a consumer camera to produce higher-quality video. In some embodiments display management unit 100E may employ a standardized mapping function, so that its operation can be predicted by other parts of the video pipeline.

Distribution phase 90C comprises encoders 97A and/or 97B. Encoder 97B includes a display management unit 100F connected to receive one or both of legacy video data and higher-quality video data (either of which may optionally have been processed by production stage 90B), and generates encoded higher-quality video data 98. Encoder 97B may also generate encoded legacy video data in some embodiments. Encoder 97A receives legacy video data only (which may optionally have been processed by production stage 90B) and generates encoded legacy data 96. Encoded video data 96 and 98 may comprise, for example bitstreams ready for distribution over the internet (e.g. AVI, MOV, MPG files), over physical media (e.g., DVDs, BluRay disks, over satellite, or other distribution channels. In the illustrated embodiment, display management unit 100F may generate encoded video data 98, for example, by interpolating or extrapolating from the incoming video signals.

Decoding of distributed video signals may be performed upstream from display phase 90D or as part of display phase 90D. Both possibilities are illustrated in FIG. 6. Decoders 99A and 99B are provided in distribution phase 90C while decoder 99C is provided in display phase 90D. In the illustrated embodiment, the output from decoder 99B is provided to a display management unit 100G which may map the output video signal for downstream display. Decoders 99A and 99B may also receive data 93 specifying the characteristics and/or viewing environments of displays where the video content will be viewed. In some embodiments, display management unit 100G may interpolate/extrapolate from encoded legacy and higher-quality video data 96 and 98 to generate video data optimized for target displays based on data 93. In some embodiments, decoder 99B may be configured to send legacy video data unless an appropriate signal is received from a downstream display, or to send higher-quality video initially and look for an acknowledgment signal from a downstream display, and if no acknowledgment is received, then iteratively downgrade the quality of the video data until an acknowledgment is received.

The display phase 90D of FIG. 6 illustrates a number of possibilities for display. Display 102A may receive legacy video data 91A or color timed legacy video data 94A directly, or from decoder 99A. Display 102B includes a display management unit 100H which maps video data that has been previously decoded for optimum display. Display 102C includes a decoder 99C which decodes incoming video data and a display management unit 100I which maps the decoded video data for optimum display. Display 102D receives video data that has been decoded and processed by upstream display management unit 100G of decoder 99B. Display 102E receives the same video data as display 102D but includes an additional display management unit 100J which may further map the video data for optimum display. Display 102F receives higher-quality video data 91B directly and includes a display management unit 100K which may further map the video data for optimum display.

Display 102G receives higher-quality video data 91B that has been processed by an upstream display management unit 100L. Display management units 100H-K may also include ambient management blocks for adapting to ambient light conditions at the respective displays.

Figure 7:
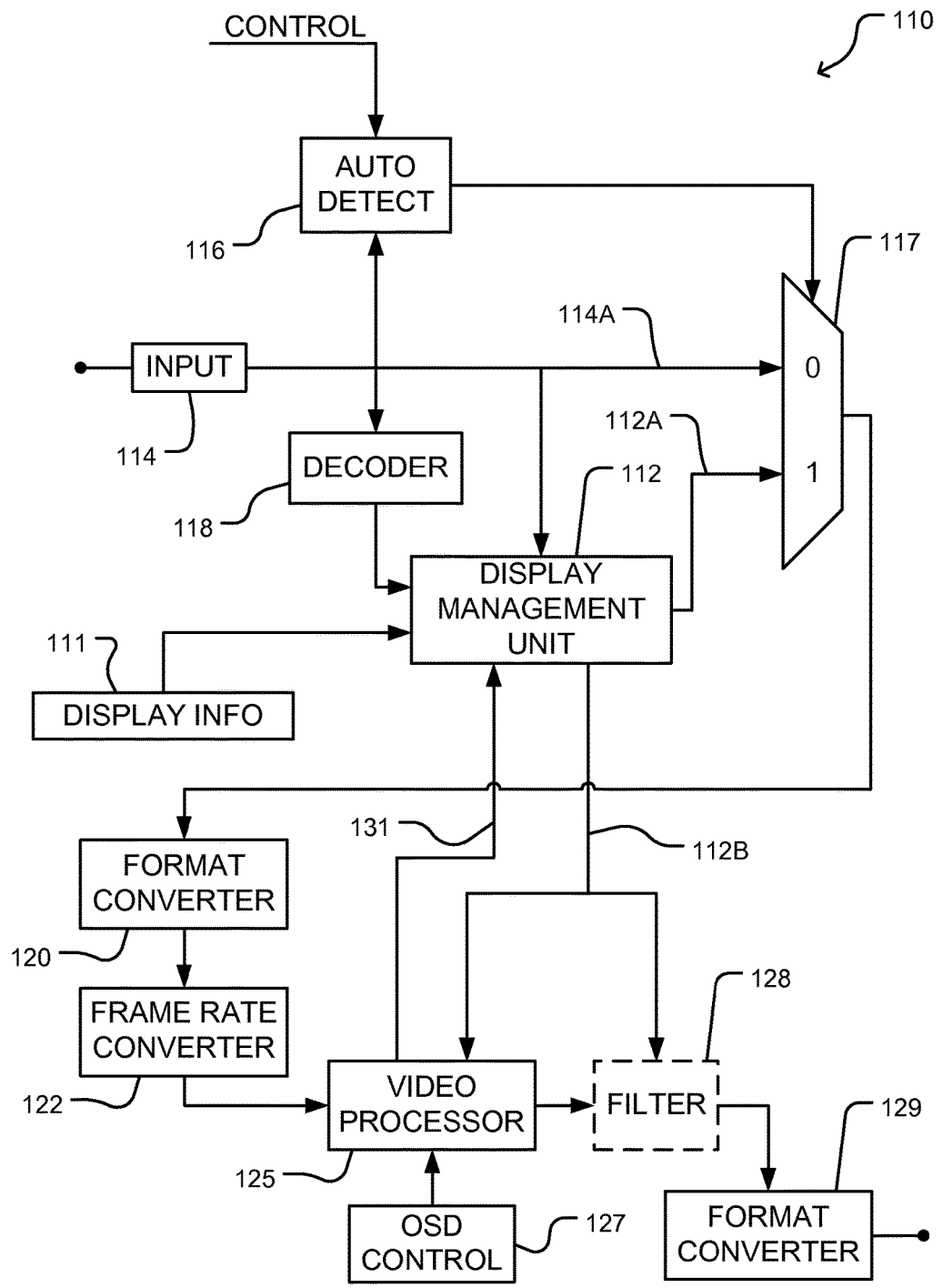
FIG. 7 is a block diagram of a video signal path within a display that includes a display management unit.

FIG. 7 is a block diagram of a video signal path within a display 110 that includes a display management unit 112. Display 110 has an input 114 for receiving video data. In the illustrated embodiment, display 110 is configured to auto-detect a format of the video data presented at input 114. An auto-detect block 116 determines if the video data is in a high-quality format. Auto-detect block 116 may determine the format of the video data, for example, by any of a variety of techniques known in the art. Alternatively, the format of video data may be user-specified. Otherwise the video data is assumed to be in a legacy format.

High-quality video data, if present, is decoded by decoder 118 and passed to display management unit 112. Display management unit 112 may additionally receive display information 111 (such as, for example, enhanced display identification data (EDID), or ICC profiles) specific to display 110. Display management unit 112 may additionally receive legacy video data if also present in the data presented at input 114. Display management unit 112 outputs video data 112A that has been mapped from video data 114A presented at input 114.

Auto detect block 116 controls multiplexer 117 to either pass through unmodified video data 114A if high-quality video data is not present or to pass through the output 112A of display management unit 112 if high-quality video data is present. Display management unit 112 may augment legacy data according to downstream processing requirements in some embodiments if o high-quality video data is present. The video data from multiplexer 117 is passed to a downstream processing pipeline. In the FIG. 7 embodiment, the downstream processing pipeline comprises a format converter 120 and a frame rate converter 122 which collectively assemble frames of video data for display in a format suitable for processing by a video processor 125. An on-screen display control 127 allows users to view the status of and control the operation of video processor 125. A stream of video data output by video processor 125 is optionally filtered by a filter 128 and converted to a format suitable for driving the display by a format converter 129. The downstream processing pipeline may have different configurations in other embodiments.

The mappings performed by display management unit 112 may be controlled based on one or more of metadata received with the video data (or separately), feedback 131 from video processor 125 and/or on-screen display control 127 (for example, a video controller) and image content. Display management unit 112 may optionally generate and/or pass control signals 112B containing metadata or other information to downstream blocks such as video processor 125, filter 128 etc.

Input and output video signals may be encoded in any suitable manner or manners. For example, the signals may specify:
values associated with a number of primary colors (e.g. R, G and B values);
luminance and chroma values (e.g. YUV, YCbCr, Log Yxy, Log Yu'v' formats);
tristimulus values;
LMS values;
HVS parameters;
etc.

These values may be carried in any suitable format including video formats such as:
Rec. 709 (as specified by ITU-R Recommendation BT.709);
PAL/SECAM
DCI
SMPTE or suitable file formats. In some embodiments the encoding of the output signal may be different from the encoding of the input signal. In general, the input and output signals may be encoded in any suitable scheme having any suitable number of primary colors, encoded linearly or non-linearly at any suitable bit depth.

Display management units as described herein may be applied in a wide range of video processing and display applications. For example, without limitation, display management units may be configured to:
Adjust source video data having a defined or assumed color and luminance ranges to suit defined or assumed capabilities of a target device.
Adjust source video data to maximize utilization of the capabilities of a target device.
Adjust source video data in a manner that preserves a creative intent implicit or specified in the source video data.
Adjust source video data in a manner that reduces or minimizes artefacts in the resulting video data.
Adjust source video data based on behaviors of the human visual system.
Adjust source video data in a robust and temporally stable manner.
Adjust source video data based on parameters of one or more of: a source, a target, a source environment and a target environment.
Adjust by performing extrapolation or interpolation of source video data based on differences between source and target parameters.
Adjust by performing extrapolation or interpolation of multiple streams of source video data based on differences between source and target parameters.

Certain implementations of the invention comprise computer processors which execute software instructions which cause the processors to perform a method of the invention. Aspects of the invention may also be provided in the form of a program product. The program product may comprise any medium which carries a set of computer-readable signals comprising instructions which, when 10 executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for providing video signals for display on a target display, the method comprising:
   receiving a first input video signal having a first format wherein a video parameter is represented within a first range;
   receiving a second input video signal having a second format wherein the video parameter is represented within a second range different from the first range, the first and second input video signals comprising different versions of the same video content;
   determining a target range of the target display;
   generating a target value for the video parameter by extrapolating or interpolating the target value from first and second values of the video parameter in the first and second input video signals respectively, the interpolation from the first and second values of the parameter based on the first range, the second range, and the target range; and
   outputting the target value to the target display;
   wherein:
   one of the first and the second range is a range greater than a corresponding range of the target display; and
   the extrapolating or interpolating comprises a multi-range process including two or more of an unaltered range, a compressed range and a clipped range.

2. A method according to claim 1 wherein the video parameter comprises a tone or color value.

3. A method according to claim 2 comprising performing the extrapolating or interpolating for the tone or color value for pixels of a video frame.

4. A method according to claim 3 wherein for at least some of the pixels a value of the parameter is the same in the first and second input video signals.

5. A method according to claim 4 wherein the interpolation or extrapolation is performed on-the-fly for values of the video parameter specified for pixels in the first and second input video signals.

6. A method according to claim 4 wherein one of the first and second input video signals comprises a Rec. 709 video signal.

7. A method according to claim 4 wherein one of the first and second ranges covers the full range of parameter values perceptible by the human visual system.

8. A method according to claim 1 wherein the interpolation or extrapolation is performed in a perceptually linear color space.

9. A method according to claim 8 wherein the perceptually linear color space comprises an IPT, Log Yxy or Log Yu'v' color space.

10. A method according to claim 9 wherein the interpolation or extrapolation comprises tone mapping and the tone mapping comprises determining a weighted sum of logarithms of tone values from the first and second video signals.

11. A method according to claim 10 wherein, in the tone mapping, the weighted sum is determined using a weighting factor based on a difference between a maximum of the target range and a maximum of one of the first and second ranges.

12. A method according to claim 1 comprising, determining whether a capability of the target display matches a capability associated with one of the first input video signal and the second input video signal and, if so, passing the matching one of the first and second input video signals to the target display.

* * * * *